(12) United States Patent
Seiler et al.

(10) Patent No.: US 11,609,033 B2
(45) Date of Patent: Mar. 21, 2023

(54) CONDENSER FAN CONTROL SYSTEM

(71) Applicant: Johnson Controls Technology Company, Auburn Hills, MI (US)

(72) Inventors: Aron M. Seiler, Freeland, MD (US); Nathan T. Ostrye, Milwaukee, WI (US)

(73) Assignee: Johnson Controls TYCO IP Holdings LLP, Milwaukee, WI (US)

( * ) Notice: Subject to any disclaimer, the term of this patent is extended or adjusted under 35 U.S.C. 154(b) by 39 days.

(21) Appl. No.: 15/994,835

(22) Filed: May 31, 2018

(65) Prior Publication Data

US 2019/0331380 A1 Oct. 31, 2019

Related U.S. Application Data

(60) Provisional application No. 62/663,047, filed on Apr. 26, 2018.

(51) Int. Cl.

| | |
|---|---|
| *F25B 49/02* | (2006.01) |
| *F24F 11/49* | (2018.01) |
| *F24F 11/70* | (2018.01) |
| *F25B 39/04* | (2006.01) |
| *G05B 13/02* | (2006.01) |
| *F24F 140/20* | (2018.01) |
| *F24F 110/12* | (2018.01) |

(52) U.S. Cl.
CPC ............ *F25B 49/027* (2013.01); *F24F 11/49* (2018.01); *F24F 11/70* (2018.01); *F25B 39/04* (2013.01); *G05B 13/024* (2013.01); *F24F 2110/12* (2018.01); *F24F 2140/20* (2018.01); *F25B 2339/04* (2013.01); *F25B 2600/111* (2013.01); *F25B 2700/15* (2013.01); *F25B 2700/19* (2013.01); *F25B 2700/21* (2013.01)

(58) Field of Classification Search
CPC ......... F25B 49/027; F24F 11/70; F24F 11/30; F24F 11/49; F24F 2110/12; G05B 13/024
See application file for complete search history.

(56) References Cited

U.S. PATENT DOCUMENTS

| | | |
|---|---|---|
| 6,601,397 B2 | 8/2003 | Pham et al. |
| 6,745,584 B2 | 6/2004 | Pham et al. |
| 6,802,186 B2 | 10/2004 | Holmes et al. |
| 7,246,500 B2 | 7/2007 | Singh et al. |

(Continued)

FOREIGN PATENT DOCUMENTS

WO 2016138382 A1 9/2016

*Primary Examiner* — Henry T Crenshaw
(74) *Attorney, Agent, or Firm* — Fletcher Yoder P.C.

(57) ABSTRACT

A heating and cooling system that includes a condenser coil configured to receive a refrigerant. A first compressor and a second compressor that pump the refrigerant through the condenser coil. A first condenser fan and a second condenser fan that push air over the condenser coil. A controller that receives a signal indicative of an ambient air temperature, a signal indicative of an operational status of the first compressor, and a signal indicative of an operational status of the second compressor. The controller controls operation of the first condenser fan and the second condenser fan in response to the signal indicative of the ambient air temperature, the signal indicative of the operational status of the first compressor and the signal indicative of the operational status of the second compressor.

10 Claims, 6 Drawing Sheets

(56) References Cited

U.S. PATENT DOCUMENTS

| | | |
|---|---|---|
| 7,287,395 B2 | 10/2007 | Nash, Jr. |
| 7,748,225 B2 | 7/2010 | Butler et al. |
| 8,484,990 B2 | 7/2013 | Ballet et al. |
| 9,038,404 B2 | 5/2015 | Judge et al. |
| 9,297,567 B2 | 3/2016 | Zolli et al. |
| 9,671,125 B2 | 6/2017 | Mowris et al. |
| 9,810,469 B2 | 11/2017 | Boehde |
| 2005/0223725 A1* | 10/2005 | Crane ............... F25B 49/02 62/183 |
| 2006/0112703 A1* | 6/2006 | Singh ............... F25B 49/027 62/181 |
| 2006/0130501 A1* | 6/2006 | Singh ............... F25B 49/027 62/183 |
| 2007/0130976 A1* | 6/2007 | Akehurst ........... F25B 49/027 62/228.5 |
| 2014/0096547 A1* | 4/2014 | Boehde ............. F24F 1/50 62/181 |
| 2016/0363359 A1 | 12/2016 | Lin et al. |
| 2017/0292767 A1 | 10/2017 | Douglas et al. |
| 2018/0031292 A1 | 2/2018 | Liu et al. |
| 2019/0092134 A1* | 3/2019 | Vehr ................. B60H 1/004 |

\* cited by examiner

_US 11,609,033 B2_

CONDENSER FAN CONTROL SYSTEM

CROSS REFERENCE TO RELATED APPLICATIONS

This application claims priority from and the benefit of U.S. Provisional Application Ser. No. 62/663,047, entitled "CONDENSER FAN CONTROL SYSTEM", filed Apr. 26, 2018, which is hereby incorporated by reference in its entirety for all purposes.

BACKGROUND

The present disclosure relates generally to vapor compression systems.

Heat exchangers are used in heating, ventilation, and air conditioning (HVAC) systems to exchange energy between fluids. Typical HVAC systems have two heat exchangers commonly referred to as an evaporator coil and a condenser coil. The evaporator coil and the condenser coil facilitate heat transfer between air surrounding the coils and a refrigerant that flows through the coils. For example, as air passes over the evaporator coil, the air cools as it loses energy to the refrigerant passing through the evaporator coil. In contrast, the condenser coil facilitates the discharge of heat from the refrigerant to the surrounding air. To assist in the discharge of heat from the condenser coil, HVAC systems may include condenser fans that draw or blow air over the condenser coil.

SUMMARY

The present disclosure relates to a heating and cooling system that includes a condenser coil configured to receive a refrigerant. A first compressor and a second compressor that pump the refrigerant through the condenser coil. A first condenser fan and a second condenser fan that push air over the condenser coil. A controller that receives a signal indicative of an ambient air temperature, a signal indicative of an operational status of the first compressor, and a signal indicative of an operational status of the second compressor. The controller controls operation of the first condenser fan and the second condenser fan in response to the signal indicative of the ambient air temperature, the signal indicative of the operational status of the first compressor and the signal indicative of the operational status of the second compressor.

The present disclosure also relates to a heating and cooling system that includes a heating, ventilation, and air conditioning (HVAC) controller that couples to a first compressor, a second compressor, a first condenser fan and a second condenser fan. The controller receives a signal indicative of an ambient air temperature and activates the first condenser fan and/or the second condenser fan in response to the ambient air temperature and an operational status of the first compressor and the second compressor to push air over a condenser coil to facilitate heat transfer.

The present disclosure also relates to a method of controlling a heating and cooling system. The method includes detecting an ambient air temperature. The method may then determine a number of operating compressors of a plurality of compressors and a respective capacity of each operating compressor. The plurality of compressors pump a refrigerant through a heating and cooling system. The method may then activate one or more of a plurality of condenser fans in response to detecting the ambient air temperature, the number of operating compressors, and the respective capacity of each operating compressor. The plurality of condenser fans push air across a condenser coil to facilitate heat transfer.

DRAWINGS

DETAILED DESCRIPTION

Heating, ventilation, and air conditioning (HVAC) systems include various components powered by electricity. These components may include fans, valves, and compressors. Typically, compressors use electricity as they compress and drive the refrigerant through the refrigeration loop of the HVAC system. However, over time the cumulative use of electricity by components other than the compressor may be significant. Condenser fans draw or blow air over the condenser coil to facilitate heat rejection by the refrigerant. Condenser fans are powered by electric motors that may use significant amounts of electricity over time, especially for industrial HVAC systems. Accordingly, reducing power consumption by components such as condenser fans may reduce the operating costs of HVAC systems.

Embodiments of the present disclosure include a condenser fan control system configured to control operation of one or more condenser fans of an HVAC system to reduce power consumption and wear of the condenser fans. As will be explained below, the condenser fan control system controls the condenser fans using the detected ambient temperature in combination with the loading of the compressors. The condenser fan control system may not use feedback from either a refrigeration temperature sensor or a refrigeration pressure sensor in order to determine how many condenser fans to activate. Thus, the condenser fan control system may reduce the number of components in an HVAC system as well as energy consumption, while still controlling the rate of heat transfer from the condenser coil.

Figure 1:
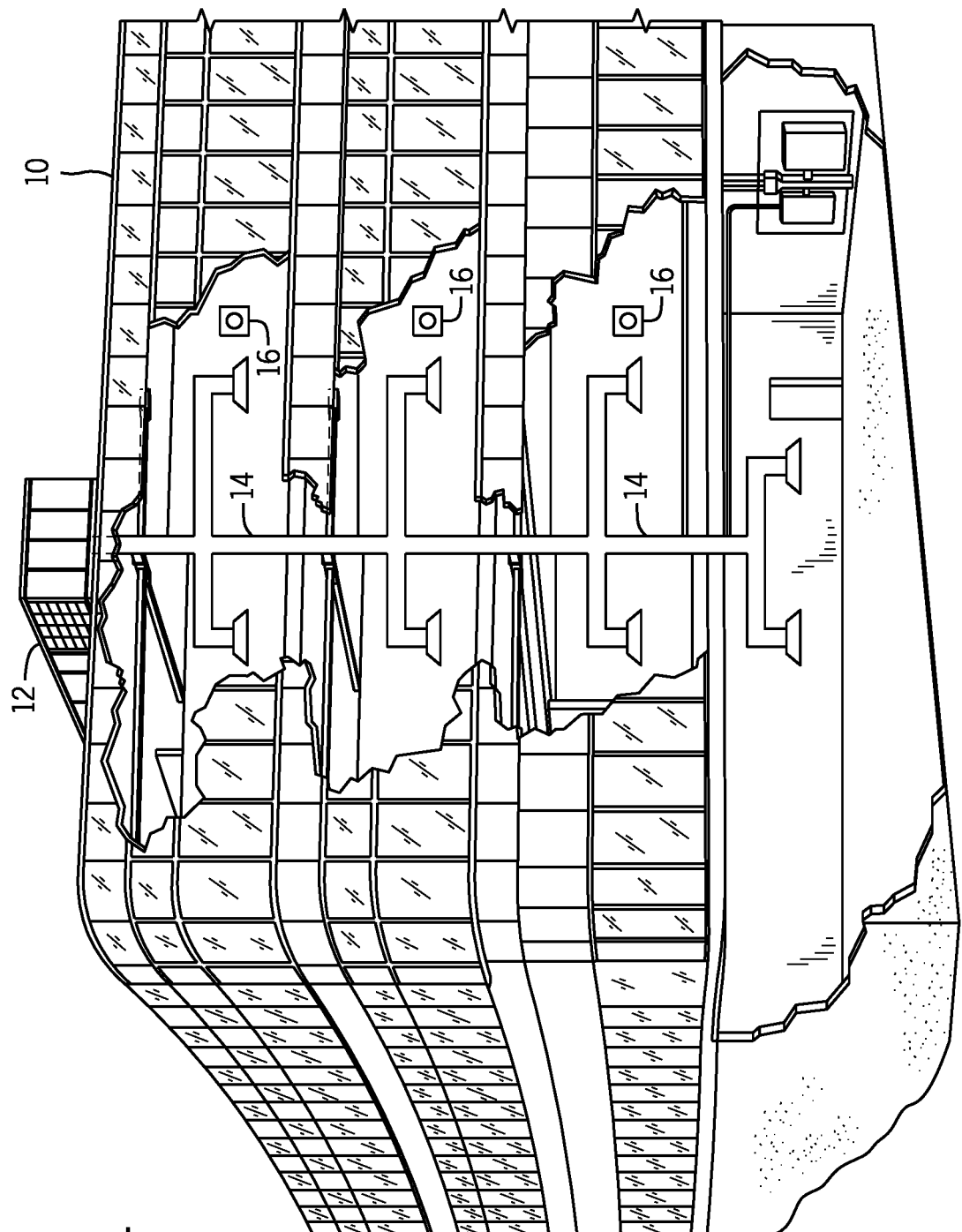
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air-cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
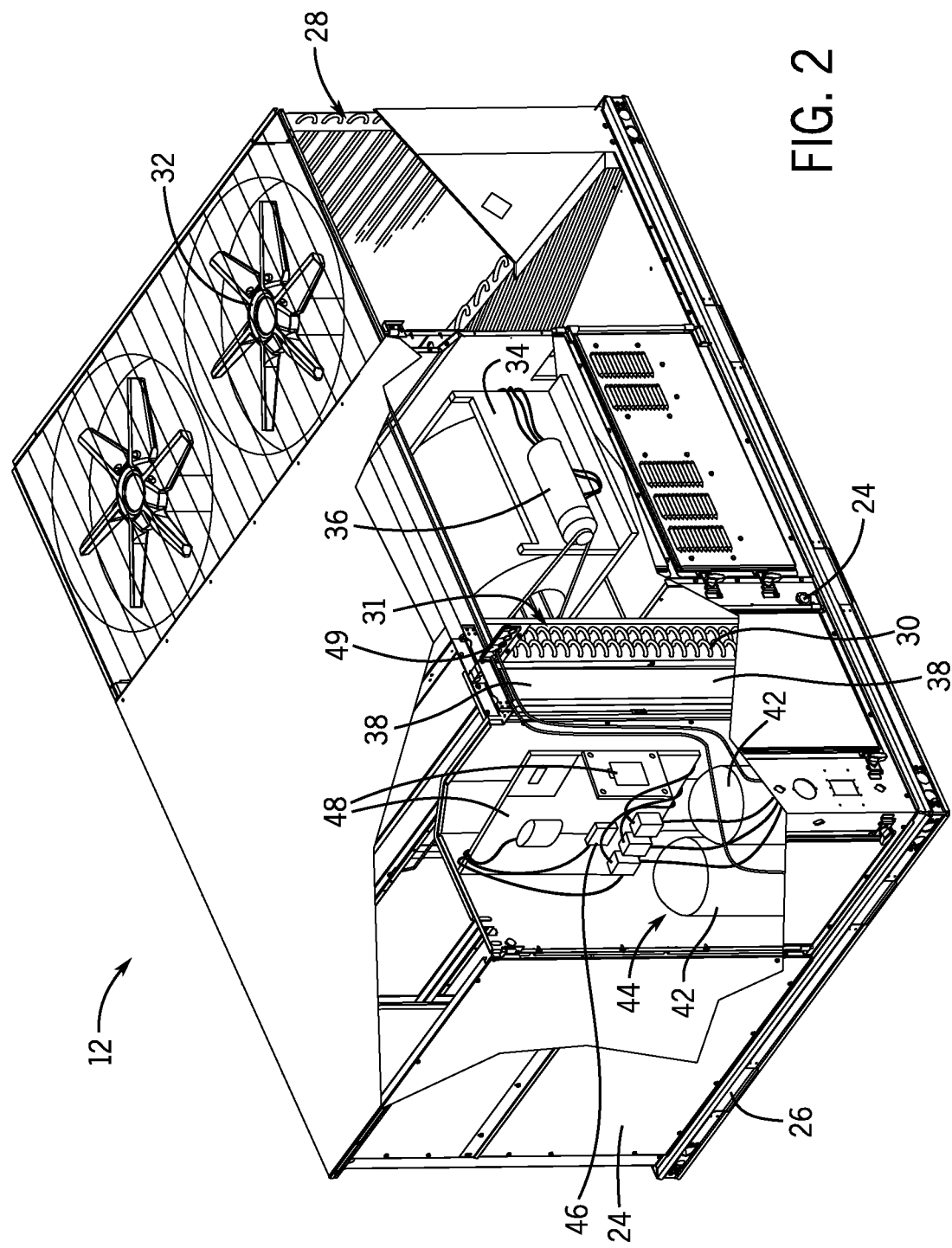
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive him arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
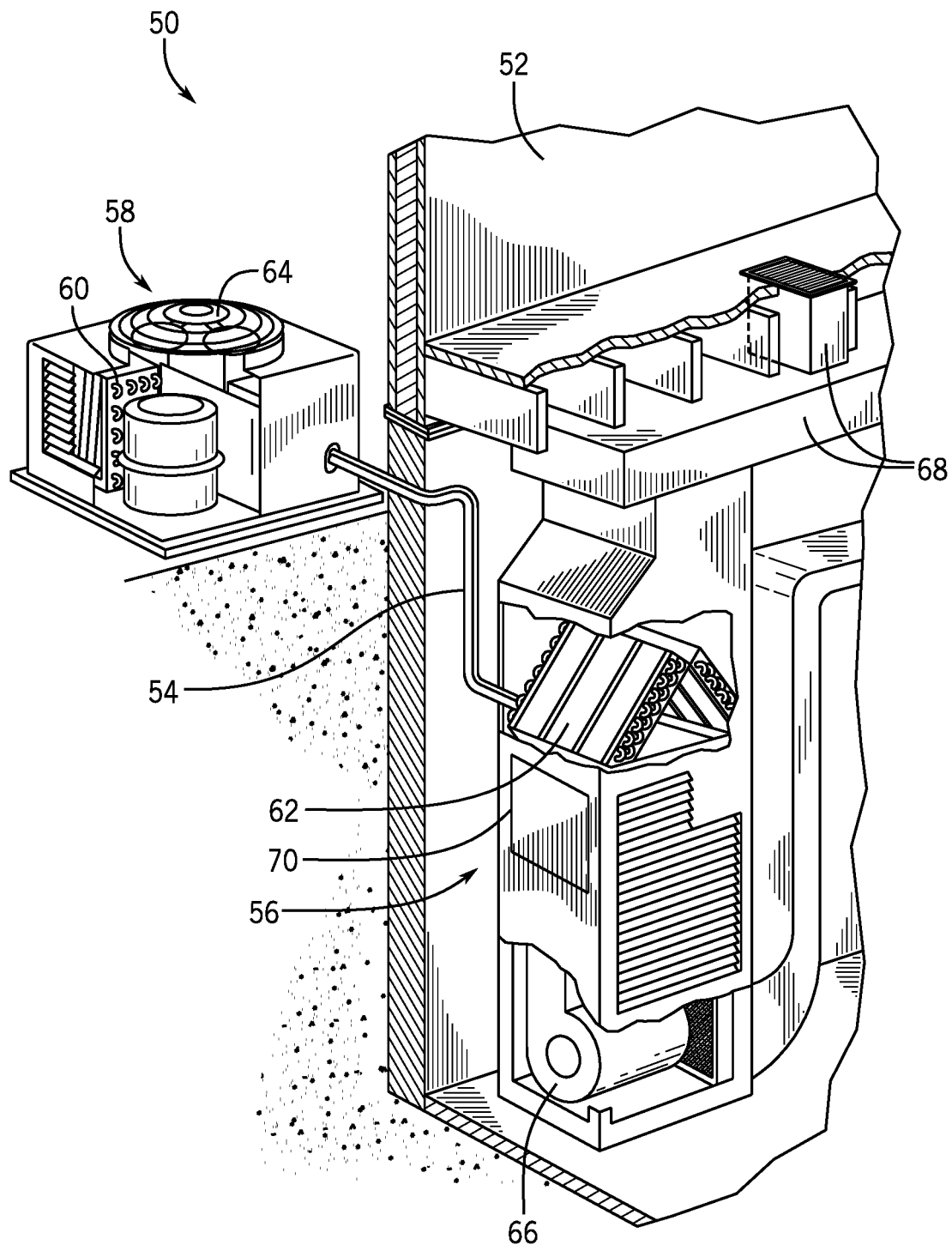
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50 in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
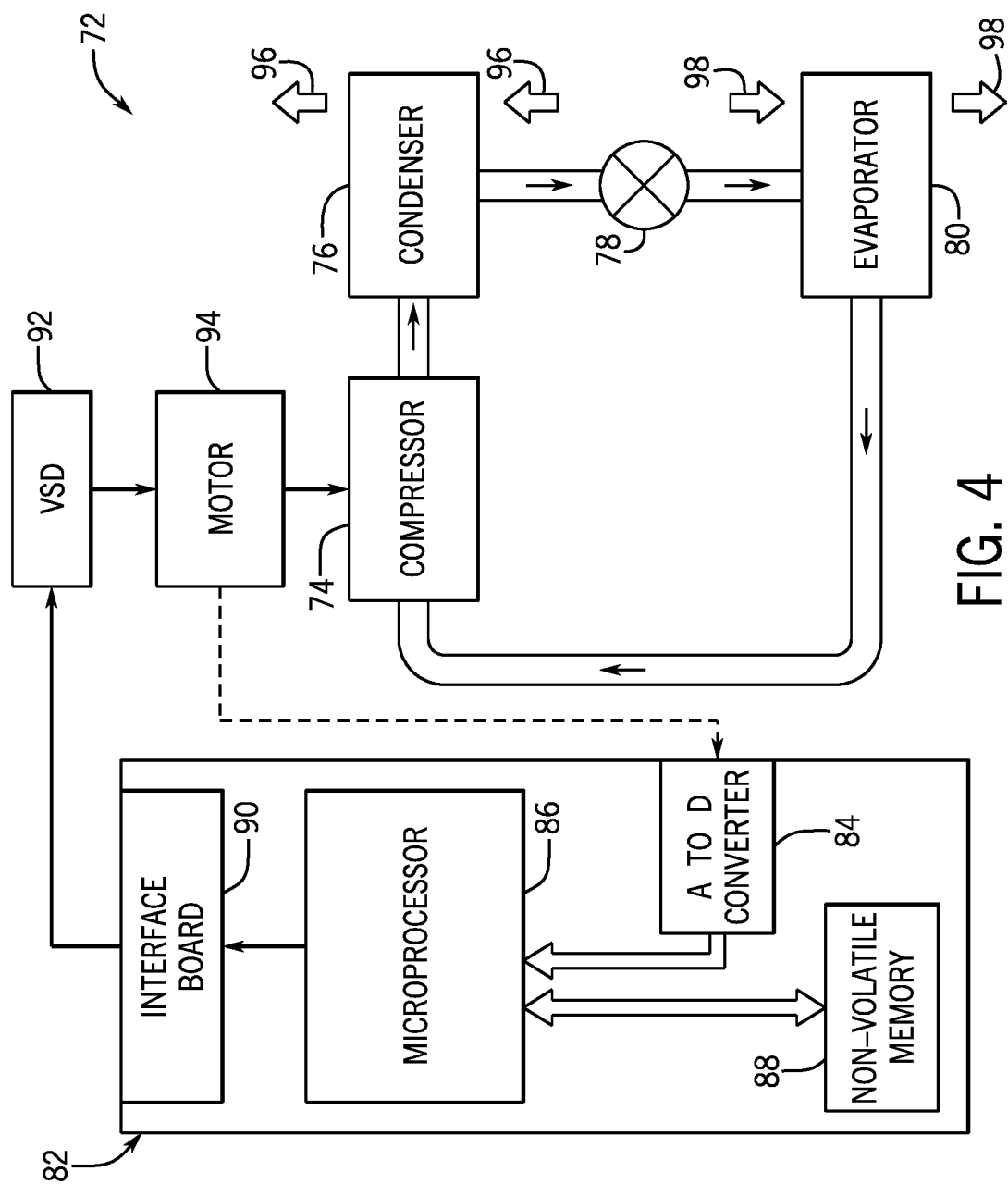
FIG. 4 is a schematic of an embodiment of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
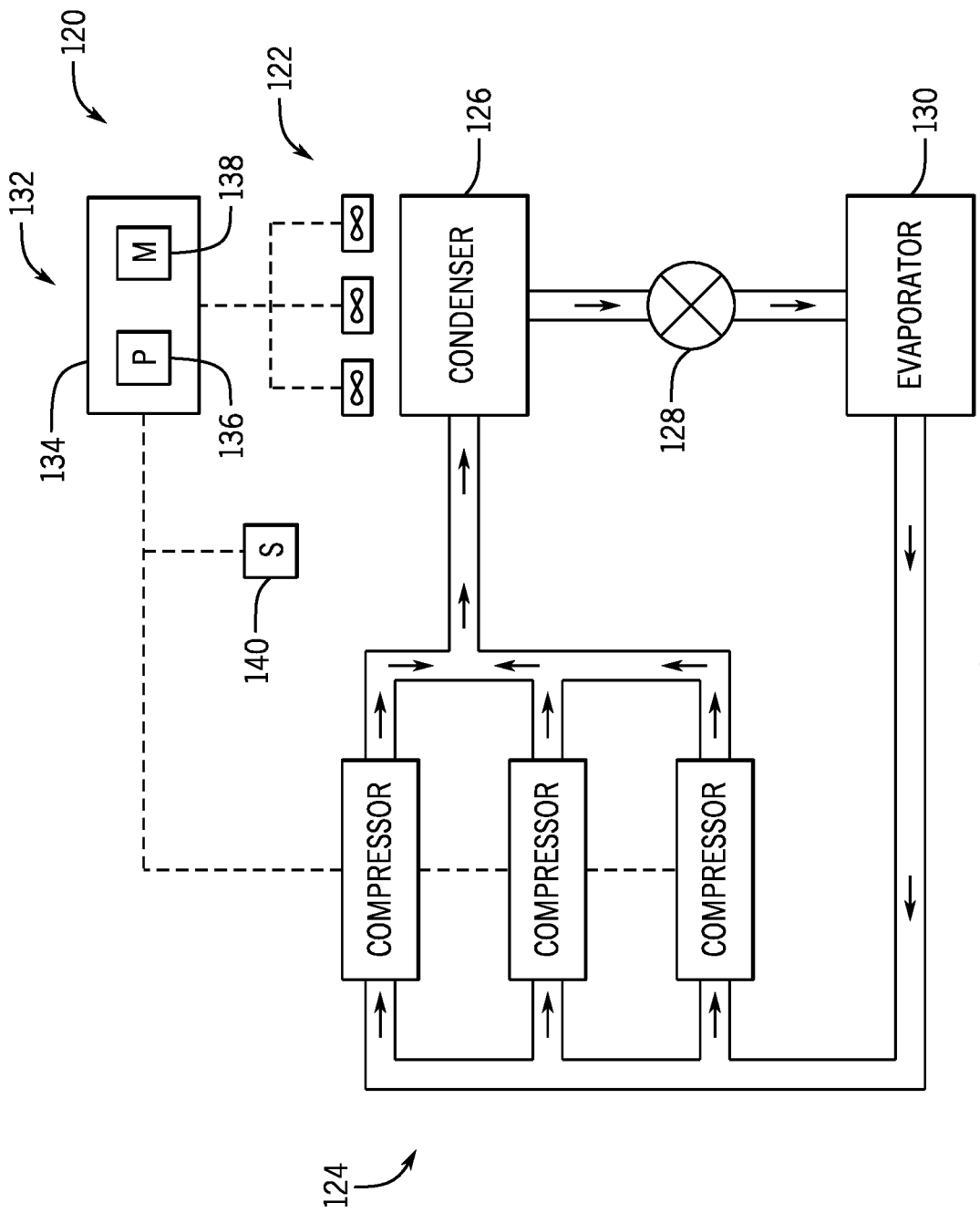
FIG. 5 is a schematic view of an embodiment of an HVAC system with a condenser fan control system, in accordance with an aspect of the present disclosure.

FIG. 5 is a perspective view of an embodiment of an HVAC system or vapor compression system 120 with a plurality of condenser fans 122. The HVAC system 120 circulates a refrigerant in a refrigeration cycle using compressors 124. As illustrated, the HVAC system 120 includes multiple compressors 124 that enable the HVAC system 120 to operate at different loading conditions. That is, the HVAC system 120 may use all or a subset of the compressors 124 depending on the demand for heating or cooling. For example, the HVAC system 120 may cool a building; however, the ambient temperature may be such that the full cooling capacity of the HVAC system is not desired. The HVAC system 120 may therefore operate a subset of the plurality of compressors 124 to save power. It should be understood that the compressors 124 may each have the same load capacity or different loading capacities. For example, all the compressors 124 may be 10-ton compressors, or one of the compressors 124 may be a 10-ton compressor while the others may be 5-ton compressors. By including the plurality of compressors 124, each of which may be operated individually, the HVAC system 120 enables reduced power consumption and wear of various components during reduced loading conditions. In some embodiments, all of the compressors 124 may be fixed speed compressors.

The HVAC system 120 includes a condenser coil 126, an expansion valve(s) or device(s) 128, and an evaporator coil 130. In operation, the plurality of compressors 124 compresses a refrigerant vapor and delivers the vapor to the condenser coil 126 through a discharge passage. In the condenser coil 126, the refrigerant rejects heat to a fluid passing across the condenser coil 126, such as ambient or environmental air. As the refrigerant vapor rejects heat, it condenses to a refrigerant liquid. The ambient or environmental air may be blown or drawn across the condenser coil 126 using one or more of the condenser fans 122.

As explained above, the HVAC system 120 may not use all of the compressors 124, such as during reduced cooling loads. Operating a reduced number of compressors 124 reduces the amount of refrigerant flowing through the condenser coil 126 with a corresponding drop in the amount of heat rejection from the refrigerant. Accordingly, the HVAC system 120 may save energy by operating fewer than all of the condenser fans 122 while still enabling the desired amount of heat transfer from the refrigerant flowing through the condenser coil 126.

After passing through the condenser coil 126, the liquid refrigerant flows through one or more expansion devices 128 to the evaporator coil 130. In the evaporator coil 130, the liquid refrigerant absorbs heat from another air stream, such as a supply air stream provided to a building or residence. For example, the supply air stream may include ambient or environmental air, return air from a building, or a combination of the two. The liquid refrigerant in the evaporator coil 130 may undergo a phase change from the liquid refrigerant to a refrigerant vapor. In this way, the evaporator coil 130 may reduce the temperature of the supply air stream via thermal heat transfer with the refrigerant. The vapor refrigerant exits the evaporator coil 130 and returns to the compressors 124 by a suction line to complete the cycle.

In order to determine how many condenser fans 122 are activated, the HVAC system includes a condenser fan control system 132 configured to control which and how many of the condenser fans 122 are activated. The condenser fan control system 132 includes a controller 134 that includes a processor 136 and a memory 138. For example, the processor 136 may be a microprocessor that executes software to control the operation of the condenser fans 122. The processor 136 may include multiple microprocessors, one or more "general-purpose" microprocessors, one or more special-purpose microprocessors, and/or one or more application specific integrated circuits (ASICS), or some combination thereof. For example, the processor 136 may include one or more reduced instruction set (RISC) processors.

The memory 138 may include a volatile memory, such as random access memory (RAM), and/or a nonvolatile memory, such as read-only memory (ROM). The memory 138 may store a variety of information and may be used for various purposes. For example, the memory 138 may store processor executable instructions, such as firmware or software, for the processor 136 to execute. The memory may include ROM, flash memory, a hard drive, or any other suitable optical, magnetic, or solid-state storage medium, or a combination thereof. The memory may store data, instructions, and any other suitable data.

In order to determine how many condenser fans 122 to activate, the condenser fan control system 132 includes one or more ambient temperature sensors 140. The ambient temperature sensor 140 is configured to determine the ambient temperature outside of the enclosed space cooled by the refrigerant. For example, the ambient temperature sensor 140 may detect the air temperature proximate to the condenser coil 126. By detecting the ambient temperature, the controller 134 is able to determine the rate of heat transfer from the refrigerant to the surrounding environment as the refrigerant flows through the condenser coil 126. The greater the temperature difference between the refrigerant and the surrounding ambient air, the faster the heat transfer rate. Similarly, the smaller the temperature difference between the refrigerant and the surrounding ambient air, the slower the heat transfer rate. More specifically, the controller 134 uses the detected ambient temperature in an equation based on data collected during the design/prototyping of the HVAC system 120. The data included from the design/prototyping may include refrigerant temperatures, refrigerant pressures, and flow rates of refrigerant at different operating conditions.

In addition to receiving a signal indicative of the ambient temperature from the ambient temperature sensor 140, the controller 134 determines how many compressors 124 to be operating and which compressors 124 should be operating, such as based on their respective sizes. Determining how many compressors 124 to operate and their respective sizes enables the controller 134 to calculate the flowrate of refrigerant through the condenser. The combined information of ambient temperature and loading or capacity of the compressors 124 enables the controller 134 to then determine how many condenser fans 122 to activate to control the amount of heat transfer from the refrigerant. In this way, the condenser fan control system 132 is configured to control the number of active condenser fans 122, while blocking activation of unnecessary condenser fans 122 that may consume excess power. It should be understood that the condenser fan control system 132 is able to determine how many condenser fans 122 to activate without communicating with a refrigerant temperature sensor(s) and/or a refrigerant pressure sensor(s).

There may be a variety of condenser fan setups for the HVAC system 120 that may be controlled by the condenser fan control system 132. These may include embodiments containing fixed speed condenser fans 122 of the same size. In another embodiment, the HVAC system 120 may include differently sized fixed speed condenser fans 122. In another embodiment, the HVAC system 120 may include all variable drive condenser fans 122 that are the same size or different sizes. In still another embodiment, the HVAC system 120 may include a combination of one or more variable speed condenser fans 122 and one or more fixed speed condenser fans 122. These various condenser fan configurations may be controlled in different ways in order to selectively reduce/block activation and use of condenser fans 122 while still facilitating the desired heat transfer from the refrigerant flowing through the condenser coil 126.

Figure 6:
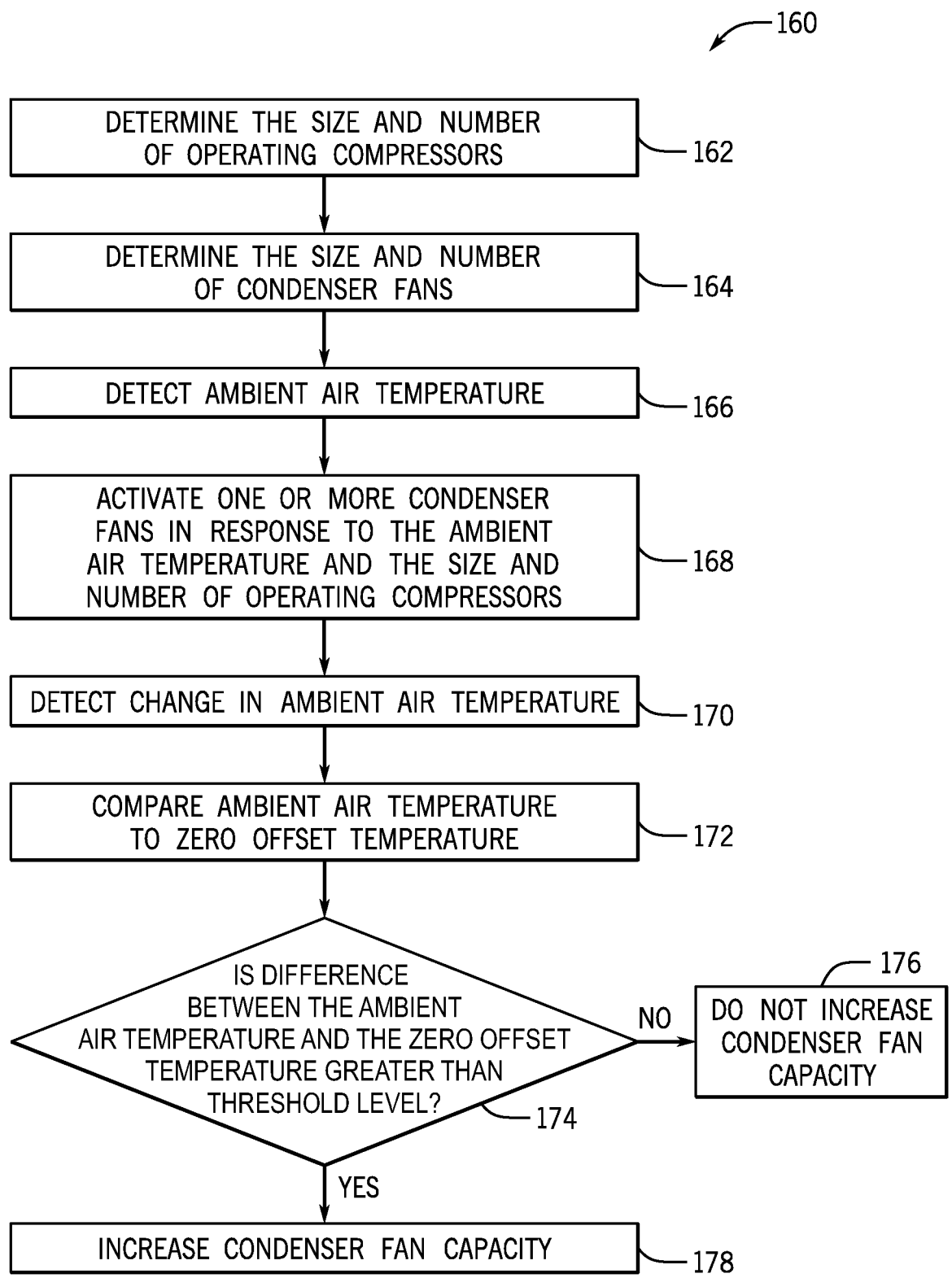
FIG. 6 is a flowchart of an embodiment of a process for controlling condenser fans of the HVAC system of FIG. 5, in accordance with an aspect of the present disclosure.

FIG. 6 is a flowchart of an embodiment of a process 160 for controlling the condenser fans 122 of the HVAC system 120 of FIG. 5. The process 160 begins by determining the size and number of operating compressors 124, as indicated by block 162. As explained above, the HVAC system 120 may include different numbers of compressors 124. The compressors 124 may also be different sizes. By determining which compressors 124 should be operating and their respective sizes, the controller 134 is able to determine the flowrate of refrigerant through the condenser coil 126.

The process 160 continues by determining the size and number of condenser fans 122, as indicated by block 164. The HVAC system 120 may include a variety of condenser fan configurations. Accordingly, determining the size and number of condenser fans 122 enables the controller 134 to customize activation of the condenser fans 122 in response to different operating conditions of the HVAC system 120, such as a cooling load of the HVAC system 120. For example, activation of a single large condenser fan 122 may be sufficient to reach a particular heat transfer rate from the refrigerant in the condenser coil 126 during a particular loading condition. The different condenser fan configurations of the HVAC system 120 may include fixed speed condenser fans 122 of the same size, fixed speed condenser fans 122 of one or more sizes, variable speed condenser fans 122 of the same size, variable speed condenser fans 122 of one or more different sizes, or a combination of one or more variable speed condenser fans 122 and one or more fixed speed condenser fans 122. Depending on the condenser fan configuration, the condenser fan control system 132 is configured to stage operation of the condenser fans 122 in different ways. In other words, the condenser fan control system 132 may activate the condenser fans 122 in different ways to reduce/block activation and use of superfluous condenser fans 122 while still enabling the desired heat transfer rate from the refrigerant flowing through the condenser coil 126.

The process 160 continues by detecting the ambient air temperature with an ambient temperature sensor 140, as indicated by block 166. As explained above, the condenser fan control system 132 enables condenser fan control without feedback from a refrigeration temperature sensor and/or a refrigeration pressure sensor. Determining the ambient temperature enables the controller 134 to determine the heat transfer rate from the refrigerant flowing through the condenser coil 126 and thus the number of condenser fans 122 to activate. The greater the difference in temperature between the refrigerant and the ambient temperature, the greater the heat transfer rate. Likewise, the smaller the temperature difference between the refrigerant and the ambient temperature, the smaller the heat transfer rate. Accordingly, by determining the ambient temperature, the controller 134 of the condenser fan control system 132 is able to determine which and how many condenser fans 122 to activate in order to control the heat transfer rate from the refrigerant flowing through the condenser coil 126.

The process then activates one or more condenser fans 122 in response to the ambient air temperature and the size and number of operating compressors 124, as indicated by block 168. As explained above, the HVAC system 120 may include fixed speed condenser fans of the same size, fixed speed condenser fans 122 of one or more sizes, variable speed condenser fans 122 of the same size, variable speed condenser fans 122 of one or more different sizes, or a combination of one or more variable speed condenser fans 122 and one or more fixed speed condenser fans 122. In each of these configurations, the condenser fan control system 132 may stage the condenser fans 122 differently. For example, in a configuration of fixed speed condenser fans 122, the controller 134 activates the appropriate number of condenser fans 122 to enable the desired heat transfer rate. If the configuration includes differently sized fixed speed condenser fans 122, the controller 134 activates the appropriate number and size of condenser fans 122. For example, the controller 134 may activate a large condenser fan 122 and a small condenser fan 122. If the configuration includes multiple variable speed condenser fans 122, the controller 134 activates the appropriate number of condenser fans 122 but also controls the speeds at which they rotate to achieve the desired heat transfer rate. For example, the controller 134 may activate a first variable speed condenser fan 122 to operate at 100% capacity and a second variable speed condenser fan 122 at 54% capacity to achieve the desired heat transfer rate.

In embodiments containing both fixed and variable speed condenser fans 122, the controller 134 may first activate one or more of the fixed speed condenser fans 122, one or more variable speed condenser fans 122, or a combination of one or more variable speed condenser fans 122 and one or more fixed speed condenser fans 122. In some embodiments that include both a variable speed condenser fan(s) 122 and one or more fixed speed condenser fans 122, the controller 134 may first activate a variable speed condenser fan 122 and then activate additional fixed speed condenser fans 122, as desired. In this way, the controller 134 may control heat transfer from the refrigerant in situations where less than the entire capacity of a single condenser fan 122 is desired. For example, as the controller 134 recognizes an increased demand for heat transfer, the controller 134 may increase the speed of the variable speed condenser fan 122 to full capacity. Once the demand increases above the full capacity of the variable speed condenser fan 122, the controller 134 may activate additional fixed speed condenser fans 122. However, if the demand is somewhere between full capacity of the variable speed condenser fan 122 and the full capacity of the fixed speed condenser fan 122, the controller 134 may activate the fixed speed condenser fan 122 and then reduce the capacity of the variable speed condenser fan 122 to less than its full capacity. In this way, the condenser fan control system 132 may respond linearly to heat transfer demands based on ambient temperature and the loading of the compressors 124.

In some embodiments, the process 160 may monitor and detect changes in the ambient temperature, as indicated by block 170. The controller 134 may compare the detected ambient temperature to a zero offset temperature, as indicated by block 172. In some embodiments, the zero offset temperature may be between 50° and 80° Fahrenheit. The controller 134 may determine whether a difference between the ambient temperature and the zero offset temperature is greater than a threshold amount, as indicated by block 174. For example, if the zero offset temperature is 65° and the threshold amount is ±10° then a detected ambient temperature between 55°-75° will not increase or decrease the condenser fan capacity. In other words, the controller 134 will not increase condenser fan capacity by activating additional condenser fans 122 and/or change operating speed of the condenser fans 122, as indicated by block 176. This threshold amount or range may also be referred to as a "deadband" in which the controller 134 does not change the heat transfer rate by increasing condenser fan capacity. However, if the ambient temperature is greater than the threshold amount or outside the threshold range, the controller 134 may increase or decrease the condenser fan capacity, as indicated by block 178. For example, the controller 134 may activate one or more additional condenser fans 122 and/or increase the speed of one or more variable speed condenser fans 122. In some embodiments, the increase or decrease in condenser fan 122 capacity may be proportional to the increase or decrease in temperature outside of the threshold amount or deadband. For example, the controller 134 may increase or decrease condenser fan capacity by 5% for every 1° in excess of the threshold amount or outside the threshold range. It should be understood though that a different proportion may be used, such as a 1%, 2%, 3%, 4%, 5%, 6%, 7%, 8%, 9%, or 10% increase or decrease in condenser fan capacity for every 1°, 2°, 3°, 4°, or 5° change in temperature. In this way, the condenser fan control system 132 reduces power consumption and wear of condenser fans 122 by reducing/blocking activation of condenser fans 122 when additional cooling capacity or heat transfer at the condenser 126 is undesired.

While only certain features and embodiments of the disclosure have been illustrated and described, many modifications and changes may occur to those skilled in the art, such as variations in sizes, dimensions, structures, shapes and proportions of the various elements, values of parameters, temperatures, pressures, mounting arrangements, use of materials, colors, orientations, and so forth, without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed subject matter. It should be appreciated that in the development of any such actual implementation, as in any engineering or design project, numerous implementation specific decisions may be made. Such a development effort might be complex and time consuming, but would be a routine undertaking of design, fabrication, and manufacture for those of ordinary skill having the benefit of this disclosure, without undue experimentation.

The invention claimed is:

1. A heating and cooling system, comprising:
a condenser coil configured to receive a refrigerant;
a first compressor and a second compressor configured to pump the refrigerant through the condenser coil;
a first condenser fan and a second condenser fan configured to push air over the condenser coil; and
a controller configured to receive a signal indicative of an ambient air temperature, a signal indicative of a first load on the first compressor, and a signal indicative of a second load on the second compressor, wherein the controller is configured to determine a temperature difference between the ambient air temperature and a zero offset temperature, wherein the controller is configured to increase throughput of the first condenser fan and the second condenser fan based on the signal indicative of the ambient air temperature, the signal indicative of the first load on the first compressor and the signal indicative of the second load on the second compressor in response to the temperature difference exceeding a threshold level, and wherein increasing the throughput of the first condenser fan and the second condenser fan is performed by the controller without feedback relating to a temperature value of the refrigerant during operation of the heating and cooling system and without feedback relating to a pressure value of the refrigerant during operation of the heating and cooling system, to facilitate heat transfer.

2. The system of claim 1, wherein the first condenser fan is a variable speed condenser fan and the second condenser fan is a fixed speed condenser fan.

3. The system of claim 2, wherein the controller is configured to activate the first condenser fan before the second condenser fan in response to operation of the first compressor and/or the second compressor.

4. The system of claim 2, wherein the controller is configured to shutdown the second condenser fan before the first condenser fan.

5. The system of claim 1, comprising a sensor configured to detect the ambient air temperature.

6. The system of claim 1, wherein a first capacity of the first condenser fan and a second capacity of the second condenser fan are different.

7. The system of claim 1, wherein the controller is configured to increase the condenser fan throughput by activating the second condenser fan.

8. The system of claim 1, wherein the controller is configured to increase the throughput by increasing a first speed of the first condenser fan.

9. The system of claim 1, wherein the controller is configured to increase throughput by activating the second condenser fan and decreasing a first speed of the first condenser fan.

10. The system of claim 1, wherein the controller is configured to control the first condenser fan and the second condenser fan based only on the signal indicative of the ambient air temperature, the signal indicative of the first load on the first compressor and the signal indicative of the second load on the second compressor.

* * * * *